Patented Aug. 24, 1954

2,687,399

UNITED STATES PATENT OFFICE 2,687,399

PROCESS FOR THE PRODUCTION OF ORGANOSILOXANES

Walter Noll and Peter Simons, Leverkusen-Bayerwerk, Germany, assignors to Farbenfabriken Bayer Aktiengesellschaft, Leverkusen, Germany, a corporation of Germany No Drawing. Application December 23, 1950, Serial No. 202,559

Claims priority, application Switzerland December 24, 1949

4 Claims. (Cl. 260—46.5)

The present invention relates to a process for producing organosiloxanes.

According to prior art processes organosiloxanes are generally produced by subjecting alkyl- or arylsilicon compounds containing hydrolysable groups to hydrolysis. The organosilicon compounds used as starting materials correspond to the general formula $SiR_nX_{4-n}$, wherein R stands for an organic radical, for instance, methyl, ethyl, butyl, phenyl, etc. X is a hydrolysable group, such as halogen, $-NH_2$, $-OC_2H_5$, and $n$ is a positive number less than 4. Upon hydrolysis at first a —Si—OH—bond is produced. Since this bond is, however, unstable in most cases it is converted by condensation into a —Si—O—Si—bond either spontaneously or by heating. Polymeric or high-polymeric siloxanes having ring-, chain- or cross-linked structures are of special technical interest whereas other gelatinous silicones being highly cross-linked are of no technical importance.

Silicones being of technical interest comprise silicones having cyclic or chain-like —Si—O—Si—groups which represent oily to low-viscous liquids, furthermore, cross-linked, linear or cyclic silicones which are suitable as starting materials for the preparation of lacquers, lubricants, resins, rubber, etc. The formation of undesired gels can be avoided by carrying out hydrolysis in an appropriate manner. It is already known to carry out hydrolysis in the presence of certain organic solvents by which gel formation is prevented. As suitable solvents for this purpose, for instance, diethyl ether, dibutyl ether, unsymmetrical ketones, such as methylpropyl ketone, furthermore, mixtures of butanol and toluene, have been proposed and employed.

In accordance with the present invention the hydrolysis is carried out in the presence of an ester which is partially miscible with water. The process can be carried out so as to form siloxanes of desired properties. When working in accordance with the invention the hydrolysis of diorgano-dihalogenosilanes yields low-molecular, particularly pentameric-cyclic organosiloxanes. When mixtures of diorgano-dihalogeno- and organo-trihalogenosilanes are subjected to hydrolysis in accordance with the invention silicon lacquers capable of being hardened are obtained.

According to the present invention aliphatic esters, especially butylacetate, have proved to be especially suitable for the new process. The butylacetate is, on the one hand, not so readily soluble in water as to cause appreciable losses of solvents caused by the separation of the silicon solvent layer and the aqueous layer as well as by washing the solvent layer by shaking with water. On the other hand, the butylacetate displays a limited solubility for water which favorably influences the velocity of hydrolysis.

For carrying out the process practically all organo-silicone compounds of the general formula $SiR_nX_{4-n}$, wherein R stands for an organic radical, X for a hydrolysable group and $n$ for one of the numbers 1, 2 and 3, may be employed. The hydrolysable group may be a halogen, an amino group, an ester group, etc. However it is a preferred embodiment of the present invention to use halogen-containing compounds which are obtainable according to the usual methods, for instance, according to the Grignard-process or by reaction of silicon metal and alkyl- or arylhalides. The methyl-chloro- and phenyl-chloro-silanes are of particular importance in the preparation of siloxanes.

The process of the present invention is further illustrated by the following examples comprising the use of methyl-chloro or phenyl-chloro-silanes and butylacetate as solvent, it being understood, however, that the invention is not limited to the use of said compounds and that many modifications may be devised without departing from the scope of the invention.

The silanes are dropped into a vigorously stirred mixture of water and ester, preferably butylacetate, either directly or after previously diluting them with a portion of the ester. A modification of the new process comprises mixing the total quantity of ester immediately with the organohalogenosilane. Since the hydrolysis proceeds strongly exothermally, the rate of feeding the organohalogenosilane or its solution in ester has to be adjusted in such a manner that no gelation takes place by a rise of temperature. This purpose may be generally accomplished by carrying out the reaction at a temperature not exceeding about 30° C. When operating in the new process with certain organohalogenosilane mixtures, for instance, mixtures prepared from methyl-chloro- and phenyl-chloro-silanes yielding silicones capable of being hardened, it may be of advantage or even necessary to keep the temperature at about 0–5° C. by cooling.

The proportion of ingredients of the three components, viz. of organohalogenosilane, ester and water, may be varied in wide limits. It is only necessary that water be present in a sufficient quantity for carrying through hydrolysis and for dissolving the hydrogen halide formed. The quantity of ester applied in the hydrolysis is preferably equal to the quantity of water.

After hydrolysis is complete the emulsion of the siloxane-solvent-mixture in the aqueous hydrochloric acid is separated into two layers by allowing it to stand. Thereupon the aqueous hydrochloric acid-layer is removed and the siloxane-solvent-layer is washed with water until the mixture reacts no longer acid. After distilling off the solvent, pure siloxane is left which may be subjected to further treatment depending on the organohalogenosilane employed in the hydrolysis and depending on the intended use.

When using in the hydrolysis mixtures of methyl-trichloro-silanes and dimethyl-dichloro-silanes, liquid or resinous siloxanes are obtained, which may be hardened to methyl-siloxane-lacquers by heating. When starting from mixtures of methyl-trichloro-silane and dimethyl-dichloro-silane with phenyl-trichloro-silane and diphenyl-dichloro-silane, mixtures of methyl- and phenyl-siloxanes are obtained which may be converted to methyl-phenyl-siloxane-lacquers by subsequent copolymerisation in known manner. The proportion of water to organochlorosilane during hydrolysis is adjusted so that for saving ester and for obtaining as small a reaction volume as possible an about 30% hydrochloric acid is obtained after hydrolysis is complete—the quantity of ester being equal to the quantity of water used.

The conditions applied in the hydrolysis of diorgano-dichloro-silanes for the preparation of low-cyclic siloxane compounds, such as, for instance, pentameric, hexameric, etc. siloxane compounds in as high a yield as possible differ somewhat from the conditions applied in the hydrolysis of organochlorosilanes for the preparation of lacquers capable of being transformed. While it is of advantage in the above mentioned hydrolysis to produce concentrated hydrochloric acid simultaneously as well as to carry out the reaction at a very low temperature and to feed the organochloro-silanes slowly to a water-ester phase, it is advantageous for the production of the above-mentioned cyclic compounds to try to obtain a very dilute hydrochloric acid while using butylacetate. Furthermore it is of advantage to add the diorgano-dichloro-silane while quickly stirring and by allowing a temperature rise up to 30-35° C.

For defining the products obtained by hydrolysis of the dialkyl-silicon compounds the latter are divided by fractional distillation into three groups:

(1) B. P. up to 100° C. at 30 Torr consisting substantially of the tetrameric compound;
(2) B. P. up to 240° C. at 7 Torr consisting substantially of the pentameric compound and small portions of higher-cyclic homologues;
(3) residue after distillation containing higher-molecular siloxanes.

In contradistinction to the hydrolysis performed with other solvents, the hydrolysis of dialkyl-dichloro-silanes while using butylacetic ester as reactant under otherwise equal conditions leads to essentially better yields of medium cyclic dialkyl-siloxane compounds and especially of the pentameric compound, which owing to its being thinly liquid, its low solidification point and its relatively high boiling point as well as to its narrow temperature-viscosity curve which is common to all siloxanes, may be utilized as hydraulic fluid for various applications.

By observing certain conditions as, for instance, the proportion of the components of the hydrolysis, the velocity of adding and stirring, and the temperature, the portion of the second group in the hydrolysate, and therewith substantially of the pentameric compound, may be further increased so as to obtain a yield of 50-60%. Further details concerning the reaction conditions are given in Example 3.

The use of the esters in the hydrolysis of hydrolysable organosilicon compounds according to the present invention is not restricted to the above described examples but may be adapted to the hydrolysis of all appropriate compounds, for instance, in the preparation of short-chain, linear siloxanes of the R₃SiO(R₂SiO)$_n$SiR₃-type which are obtained from mixtures consisting, for instance, of dialkyl-dihalogeno-silanes and trialkyl-halogeno-silanes.

In accordance with another feature of the present invention the hydrolysis of hydrolysable organosilicon compounds is carried out in the presence of a mixture of an ester being partially miscible with water and an alcohol, preferably that alcohol which is present in the ester as the alcoholic radical, the ester being an aliphatic ester such as butylacetate preferably.

The hydrolysis according to this feature of the invention proceeds smoothly. The precipitation of gel-like or crystallized siloxanes during hydrolysis is practically avoided.

The new process allows the application of all kinds of aliphatic esters besides an alcohol; in order to avoid a cross esterification it is of advantage to use that alcohol as addition which is present in the ester as alcoholic radical. The mixing proportions of alcohol and ester may vary in wide limits. It is generally advisable to employ a larger amount of ester than of alcohol. A suitable mixture according to the present invention consists, for instance, of 90 parts by weight of butylacetate and 10 parts by weight of butanol.

The aforesaid process may preferably be utilized in the hydrolysis of mixtures of hydrolyzable silanes of the formulae R₂SiX₂ and RSiX₃, wherein R stands for an organic radical and X for a hydrolyzable group; the hydrolysis of such mixtures results in the formation of a mixture of siloxanes with tri- and bifunctional siloxane groups:

and

which are prepolymerized by heating to form a lacquer base, initially soluble in organic solvents which are subsequently hardened to lacquers or resins respectively by baking at temperatures between 200 and 300° C.

Particularly suitable batches of hydrolysable organo-silicon compounds, such as alkyl- or aryl-halogeno-silanes, for the preparation of lacquers or resins comprise mixtures of methyl-tri-, dimethyldi-, diphenyldi- and phenyl-tri-chloro-silanes. For the purpose of developing the properties peculiar to lacquers and resins it is of advantage for the lacquer and the resin respectively to combine these components by hydrolysis and polymerisation in such a way that the different polysiloxane groups of such a product, in the present case the groups:

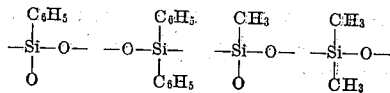

are statistically distributed in the molecular siloxane network as uniformly as possible. Since the polymerisation of the silanols primarily formed in the hydrolysis to siloxanes already begins during hydrolysis and in order to achieve a uniform distribution of the various groups, the hydrolysis, if possible, has to be regulated in such a manner that cohydrolysis of the components actually takes place.

The parts in the following examples are given by weight, if not otherwise stated.

*Example 1*

A mixture of methyl-chlorosilanes containing 66.5% Cl is prepared from methyltrichlorosilane and dimethyldichlorosilane. The ratio of $CH_3$ to Si in the mixture corresponds to 1.3 to 1. 1000 parts by volume of the mixture are slowly dropped while vigorously stirring into a mixture of 2000 parts by volume of water and 2000 parts by volume of butylacetate. The temperature is kept by cooling between 0 and 5° C.

After hydrolysis is complete the emulsion is separated by allowing it to stand for some time, the aqueous layer of hydrochloric acid is discharged and the siloxane-ester-layer is washed with water. After washing four times with 500 parts by volume of water the siloxane-ester-layer shows no longer an acid reaction.

The ester is distilled from the siloxane-ester-solution. A viscous methyl-siloxane is left which after being applied to metal sheets in a thin layer at 200° C. is converted by hardening into a lacquer.

*Example 2*

A mixture of methyl-chloro-silanes is prepared from 160 parts of methyl-trichloro-silane, 98 parts of dimethyl-dichloro-silane, 87 parts of phenyl-trichloro-silane and 192 parts of diphenyl-dichloro-silane. The mixture is slowly dropped while vigorously stirring into a mixture consisting of 1000 parts of water and 1000 parts of butyl-acetate. During the reaction the temperature is kept at 0-5° C.

When the hydrolysis is complete, the emulsion is separated into two phases by allowing it to stand for a short period, the aqueous layer of hydrochloric acid is discharged and the siloxane-ester-layer is freed from acid by washing five times with 1000 parts by volume of water.

The ester is now distilled from the siloxane-ester-layer. A resinous siloxane remains which is polymerized at 200° C. in known manner by passing through air. The product obtained is dissolved in a solvent, for instance, toluene and forms a lacquer after being applied to a metal sheet or glass-fiber strand and by baking at 250° C.

*Example 3*

300 parts by volume of dimethyl-dichloro-silane are quickly added (within 7 minutes) with very fast stirring to a mixture of 300 parts by volume of butylacetate and 2600 parts by volume of water, the temperature rising thereby to 34°

C. The further procedure corresponds to that described in the preceding examples. After distilling the butylacetate the residue is subjected to fractional distillation whereby the following fractions are obtained:

Fraction (1) 26% containing tetrameric siloxane.
Fraction (2) 54% consisting substantially of pentameric siloxane.
Fraction (3) 20% containing higher-molecular siloxanes.

Thus, the phenyl- and the methyl-components have been formed separately in the hydrolysis.

*Example 4*

A mixture of 29 parts of phenyl-trichloro-silane, 64 parts of diphenyl-dichloro-silane, 32.6 parts of dimethyl-dichloro-silane and 53.3 parts of methyl-trichloro-silane is dropped into a mixture of 360 parts of water and 360 parts of butylacetate. The butanol content in the ester is determined by titration of the consumption of acetic anhydride. The content of butanol amounts to 0.2%.

While the organochlorosilane-mixture is added the liquid begins to become turbid. After completion of the reaction the liquid contains a crystal paste brought about by precipitation of crystallized phenyl silanols. The crystal paste can be dissolved by addition of an excess of 50% butyl acetate, however, when distilling the butyl acetate the phenyl silanols precipitate again.

When carrying through the above described reaction with butyl acetate containing 10% butanol, the precipitation of solid substances during hydrolysis as well as during distillation of the solvent is avoided. The copolymerized silanol mixture thus obtained can be readily converted by condensation into a silicon lacquer at raised temperatures.

What we claim is:

1. In a process of preparing organosiloxanes by hydrolysis of a mixture of organohalogenosilanes of the general formula $SiR_nX_{4-n}$, wherein R stands for an organic radical of the group consisting of alkyl and aryl groups, X stands for a halogen and $n$ is a positive number less than 4, the step which comprises cohydrolizing the mixture with the amount of water necessary for the hydrolysis and for forming an aqueous hydrohalic acid, in the presence of a quantity of butyl acetate at least sufficient for dissolving the siloxane formed during hydrolysis, the butyl acetate containing a substantial quantity of butanol, said quantity of butanol being smaller than the quantity of butyl acetate and recovering and separating a siloxane-butylacetate layer from an aqueous layer to thereby recover the desired co-condensation product.

2. In a process of preparing organosiloxanes by hydrolysis of a mixture of organohalogenosilanes of the general formula $SiR_nX_{4-n}$, wherein R stands for an organic radical of the group consisting of alkyl and aryl groups, X stands for a halogen and $n$ is a positive number less than 4, the step which comprises cohydrolizing the mixture with the amount of water necessary for the hydrolysis and for forming an aqueous hydrohalic acid, in the presence of a quantity of butyl acetate at least sufficient for dissolving the siloxane formed during hydrolysis, the butylacetate containing 10% of butanol and recovering and separating a siloxane-butyl acetate layer from an aqueous layer to thereby recover the desired co-condensation product.

3. In a process of preparing silicon lacquers capable of being hardened by heat by hydrolysis of a mixture of a dialkyldihalogenosilane and an alkyltrihalogenosilane, the step which comprises hydrolizing the mixture of dialkyldihalogenosilanes and alkyltrihalogenosilanes with the amount of water necessary for the hydrolysis and for forming an aqueous hydrohalic acid, in the presence of a quantity of butylacetate at least sufficient for dissolving the siloxane formed during hydrolysis, the butyl acetate containing a substantial quantity of butanol, said quantity of butanol being smaller than the quantity of butyl acetate and recovering and separating a siloxane-butylacetate layer from an aqueous layer to thereby recover the desired cocondensation product.

4. In a process of preparing silicon lacquers capable of being hardened by heat by hydrolysis of mixtures of dialkyldihalogenosilanes and alkyltrihalogenosilanes, the step which comprises hydrolizing the mixture of dialkyldihalogenosilanes and alkyltrihalogenosilanes with the amount of water necessary for the hydrolysis and for forming an aqueous hydrohalic acid, in the presence of a quantity of butyl acetate at least sufficient for dissolving the siloxane formed during hydrolysis, the butyl acetate containing 10% of butanol and recovering and separating a siloxane-butyl acetate layer from an aqueous layer to thereby recover the desired cocondensation product.

References Cited in the file of this patent

UNITED STATES PATENTS

| Number | Name | Date |
| --- | --- | --- |
| 2,398,672 | Sauer | Apr. 16, 1946 |
| 2,413,582 | Rust et al. | Dec. 31, 1946 |
| 2,430,032 | Scott | Nov. 4, 1947 |
| 2,470,479 | Ferguson et al. | May 17, 1949 |

FOREIGN PATENTS

| Number | Country | Date |
| --- | --- | --- |
| 263,289 | Switzerland | Nov. 16, 1949 |